United States Patent [19]

Dinh

[11] Patent Number: 5,404,938
[45] Date of Patent: Apr. 11, 1995

[54] SINGLE ASSEMBLY HEAT TRANSFER DEVICE

[75] Inventor: Khanh Dinh, Alachua, Fla.

[73] Assignee: Heat Pipe Technology, Inc., Alachua, Fla.

[21] Appl. No.: 977,631

[22] Filed: Nov. 17, 1992

[51] Int. Cl.$^6$ ............................................. F25B 39/02
[52] U.S. Cl. .................. 165/113; 165/104.14; 165/140; 165/135; 62/90; 62/119; 62/120
[58] Field of Search ............ 165/104, 14, 140, 113, 165/135; 62/90, 119, 120

[56] References Cited

U.S. PATENT DOCUMENTS 1,870,457  8/1932  Kenney ........................... 165/140
2,072,486  3/1937  Smith ............................. 62/90

FOREIGN PATENT DOCUMENTS 3819535  12/1988  Germany .

*Primary Examiner*—Albert W. Davis, Jr.
*Attorney, Agent, or Firm*—Foley & Lardner

[57] ABSTRACT

A single assembly heat transfer device installed in an environmental control apparatus having a primary evaporator, a two-section heat pipe having an evaporator section and a condenser section, and an end plate. The primary evaporator, the evaporator section and the condenser section are mounted on the end plate, thereby forming a single assembly.

10 Claims, 8 Drawing Sheets

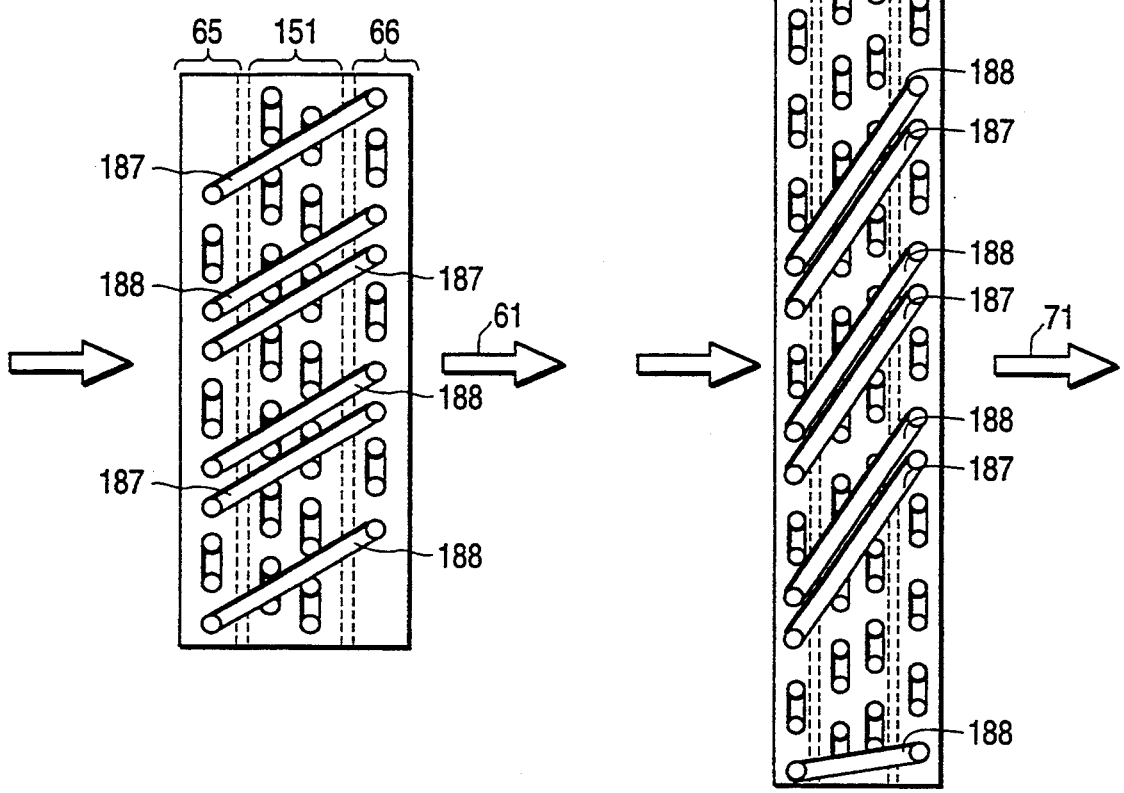
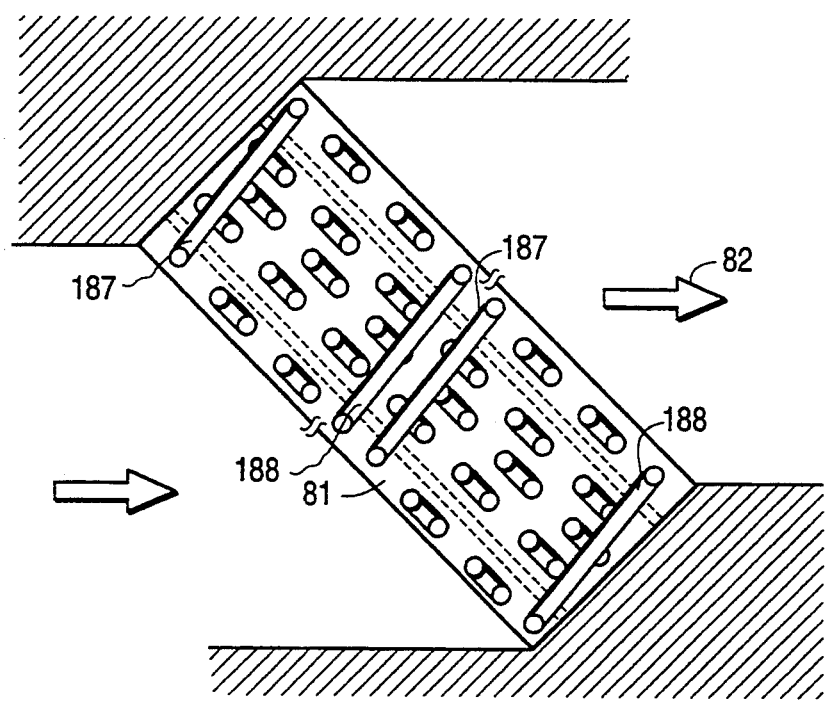

SINGLE ASSEMBLY HEAT TRANSFER DEVICE

BACKGROUND OF THE INVENTION

The present invention relates to passive heat transfer devices and more particularly relates to two-section heat pipes, which are used in conjunction with a separate air conditioner evaporator, to transfer very high heat fluxes without the addition of external energy.

So-called heat pipes are well known, and typically comprise a condenser and an evaporator connected to one another as a closed system.

Referring now to FIGS. 1 and 2, it has been proposed to reduce the fabrication and installation costs of heat pipes by utilizing U-shaped heat pipes connected to form serpentine heat pipes. Fabrication costs are decreased through the use of the U-shaped tubes. However, it was thought that the serpentine coils would inhibit fluid movement through the heat pipes, thus decreasing their efficiency. One way that such serpentine heat exchangers are rendered useful as heat pipes is to vertically orient a heat exchanger such that the tops of individual coils act as condensers and the bottoms act as evaporators. The individual coils are manifolded together to provide what was thought to be the interconnections required to enable charging all the pipes at once. Thus, referring to FIG. 1, the ends of the individual U-tubes 30A of a heat pipe are manifolded in such a way that the liquid refrigerant can move freely from tube to tube, thus assuring that the liquid level 34A is the same in all tubes. More specifically, the bottoms of the U tubes 35A are pierced and small copper tubes 36A are soldered to the perforations to interconnect the U tubes at their lower ends. The open ends of the adjacent U tubes are manifolded to one another by a straight pipe 37A. The resulting connection allows unrestricted communication between the ends of adjacent tubes and assures that the liquid level is the same in all tubes. Microgrooves 33 are formed in each tube 30A, and the individual tubes are imbedded in aluminum fins 32 to form a heat pipe heat exchanger.

In another configuration utilizing serpentine heat exchangers, two horizontal heat exchangers may be connected to one another such that the lower of the two horizontal serpentine heat exchangers acts as an evaporator and the higher one acts as a condenser. Referring to FIG. 2, it was thought necessary to manifold the U tubes 60A of the lower section by a first copper tube 63A and to manifold the U tubes 61A of the upper section in the same manner by a second copper tube 64A. The upper ends of the thus manifolded tubes are connected by a first copper connection tube 62A which serves as a vapor line, while the lower ends of these tubes are connected by a second copper connection tube 65A serving as a liquid return line.

Each of the devices illustrated in FIGS. 1 and 2 works well. However, both devices are expensive to fabricate and to install, thus rendering them unsuitable for many applications.

It is also known to use heat pipes to increase the dehumidification capacity or efficiency of an air conditioning system. One such system is described in U.S. Pat. No. 4,607,498, which issued to Khanh Dinh on Aug. 26, 1986. Referring to FIG. 3, this type of air conditioning system 110 includes a primary evaporator 124 and a heat pipe heat exchanger 126 which is provided to increase the dehumidification capacity of the system during cool and humid hours. This heat pipe consists of a pair of manifolded heat exchangers of the type illustrated in FIG. 2. A first heat exchanger 128 serves as an evaporator and is located between an inlet of the air conditioner and the primary coil 124. A second manifolded heat exchanger 130 is located between the primary evaporator 124 and the outlet of the housing and serves as a condenser of the heat pipe. The heat sections 128 and 130 are interconnected by a vapor line 134 and a return line 140.

The heat pipe heat exchanger 124 operates as follows:

Warm air enters the housing from the inlet and is cooled slightly as it passes over evaporator 128, thereby vaporizing the liquified refrigerant present in the evaporator. The air then passes over the primary evaporator 124, where it is cooled further. Meanwhile, the vaporized refrigerant rises out of the header of the evaporator 128, through conduit 134, and into the header of condenser 130. The refrigerant in the condenser 130 is cooled by air exiting the primary evaporator 124 so that it is liquefied while simultaneously reheating the air. The liquified refrigerant then flows downwardly into the inlet of evaporator 128 via conduit 140, and the process is repeated.

While the heat pipes described above significantly improve the efficiency of air conditioners, the manifolded heat pipes require additional machining of the serpentine coils and require that headers be connected to the ends of the coils. Accordingly, they are relatively difficult and expensive to fabricate. Thus, the cost of such heat pipes may render impractical their use in many applications, including many conventional air conditioning systems.

In addition, in the air conditioning system described above, the primary air conditioner evaporator 124, the evaporator 128 of the heat pipe exchanger, and the condenser 130 of the heat pipe exchanger, are all manufactured as separate sections. During the assembly of the air conditioning system, the air conditioner evaporator 124 and the heat pipe condenser 130 and evaporator 128 sections are positioned as shown in FIG. 3, and the heat pipe sections are connected to individual end plates which are in turn connected to a housing of the air conditioner system. Alternatively, the heat pipe sections can be connected directly to the housing. Moreover, it is typical for the U-tubes 61A, 60A to be disposed in openings in the end plates or the housing and to be independently expanded in a conventional manner thereby creating a pressurized fit within the end plate openings. The evaporator coils are similarly mounted in the air conditioning system. Once the mounting of the two-section heat pipe and the evaporator is completed, the open ends of the U-tubes 61A, 60A of the two-section heat pipes are connected to manifolds 64A, 65A as shown in FIG. 2, or U-bends 67 as reflected in FIG. 5. The open ends of the evaporator are likewise connected to a common manifold or U-bends. Subsequently, the U-tubes of the two-section heat pipe and of the evaporator are subjected to vacuum and then charged with a refrigerant.

The above-described method of assembly of the heat transfer device within the air conditioning system is very labor intensive, and depending on the design of the air conditioning system, may even be impossible to perform.

SUMMARY OF THE INVENTION

An object of the present invention is to provide a single assembly heat transfer device which is easy to fabricate and which is conducive to fabrication by an automated assembly process.

Another object of the invention is to provide a compact heat transfer device which can be used in small air conditioning units such as room air conditioners and Package Terminal Air Conditioners (PTACs) such as those used in hotels, motels and schools.

The above objects are met by providing a single assembly heat transfer device installed in an environmental control apparatus which includes a primary evaporator, a two section heat pipe having an evaporator section and a condenser section and an end plate upon which the primary evaporator, the evaporator and the condenser sections of the heat pipe are mounted, thereby forming a single assembly.

Yet another object of the invention is to provide a heat transfer device wherein heat conduction between the sections of the heat pipe exchanger and the air conditioning primary evaporator is minimized.

This object is met by providing a heat transfer device whereby fins surrounding the primary evaporator are separated from fins surrounding the two-section heat pipe evaporator and condenser sections by a small space.

Still another object of the invention is to provide a heat transfer device which can be used in a dehumidifier in order to more efficiently remove humidity from a room as compared to a conventional dehumidifier.

This object is met by providing a two-section heat pipe whose evaporator and condenser sections surround a primary evaporator of the dehumidifier, with the dehumidifier condenser being located downstream of the condenser of the heat pipe.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which:

FIG. 16 is a schematic view showing another embodiment of the inventive heat transfer device in a vertical state;

FIG. 17 is a schematic view showing another embodiment of the inventive heat transfer device in a vertical state;

FIG. 18 is a schematic view showing another embodiment of the inventive heat transfer device in an inclined position;

DETAILED DESCRIPTION OF THE PREFERRED EMBODIMENTS

Pursuant to the invention, a heat pipe heat exchanger is provided in the form of a serpentine heat pipe that does not have the ends of the individual tubes manifolded to one another via a straight pipe or via any other common connector. Instead, it has been discovered that heat pipes connected via U-bends to form a continuous coil function adequately.

Figure 4:
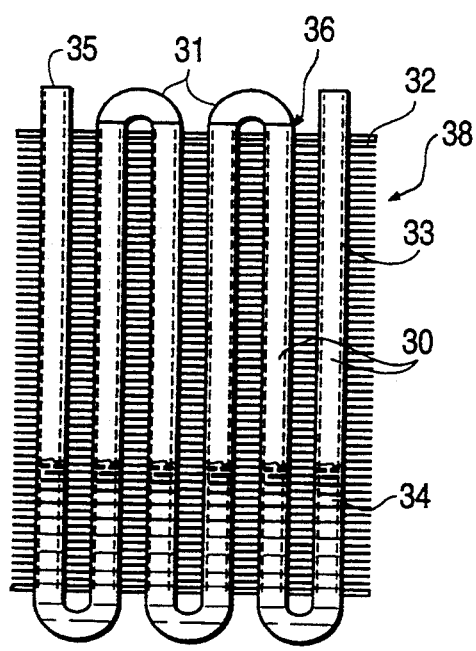
FIG. 4 is a sectional schematic elevation view of the inventive serpentine heat pipe exchanger.

Referring to FIG. 4, a heat pipe heat exchanger 38 constructed in accordance with the present invention includes a plurality of U-shaped tubes 30 which are manifolded to one another via U-bends 31 which interconnect the open ends of the adjacent tubes 30, thereby forming a serpentine heat pipe 36. The heat pipe is embedded in heat conducting fins 32, preferably formed from aluminum, thus forming the serpentine heat pipe heat exchanger 38. The individual tubes 30 do not contain a wick, but instead have microgrooves 33 formed on their internal walls for higher heat transfer.

Figure 2:
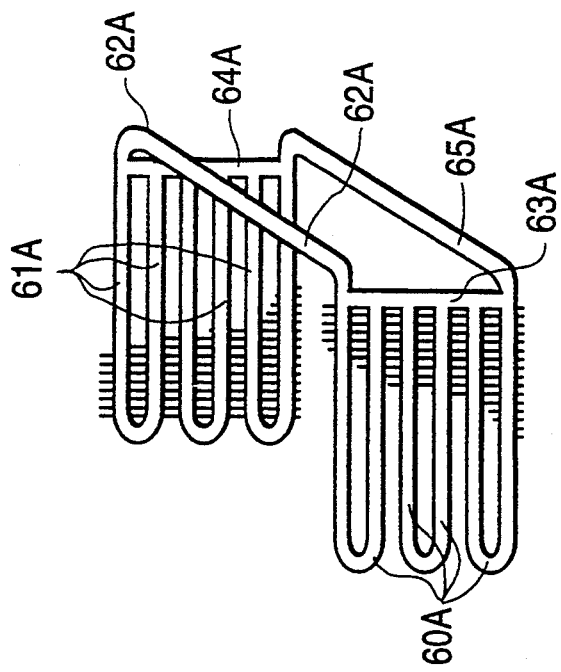
FIG. 2 is a perspective view of a conventional two-section heat pipe heat exchanger.
Figure 1:
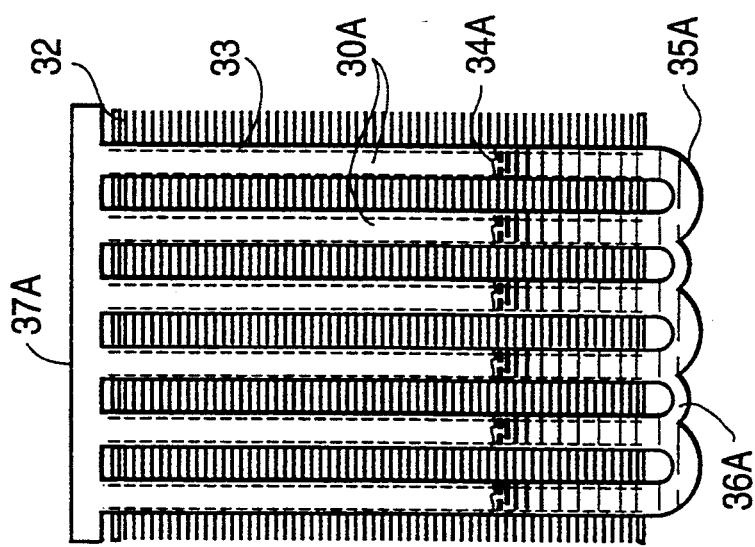
FIG. 1 is a schematic sectional side elevational view of a conventional serpentine heat pipe.

To prepare the heat pipe heat exchanger 38 of FIG. 4 for use, after the heat pipe is vacuumed a predetermined amount of refrigerant 34 is inserted into the open end of an edge tube 35 of the serpentine heat pipe 36. Enough refrigerant should be inserted so that, in steady state operating conditions, sufficient refrigerant will be present in each tube 30 to allow each tube to function adequately as a separate heat pipe. Heretofore, it was thought that such fluid levels could be obtained in the individual tubes only by manifolding the individual tubes together as described above in connection with FIGS. 1 and 2. However, it has been discovered that no such manifolding is necessary and that, the inserted fluid will be evenly distributed in the tubes as illustrated in FIG. 4 after only a few minutes of normal operation of the device. Accordingly, it has been found that the connection tubes and straight pipe manifolds of previous serpentine heat pipes are not required.

Figure 5:
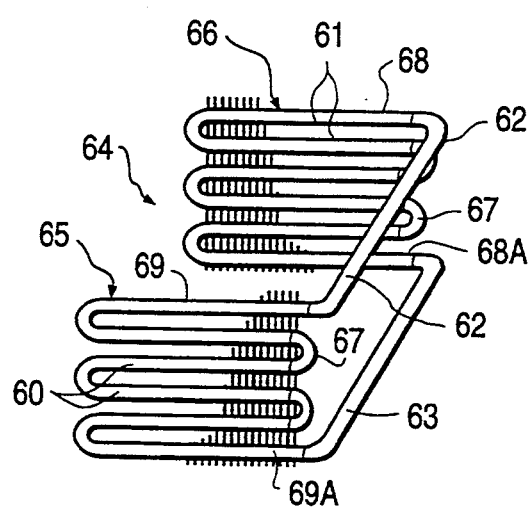
FIG. 5 is a two-section serpentine heat pipe heat exchanger constructed in accordance with the invention.
Figure 6:
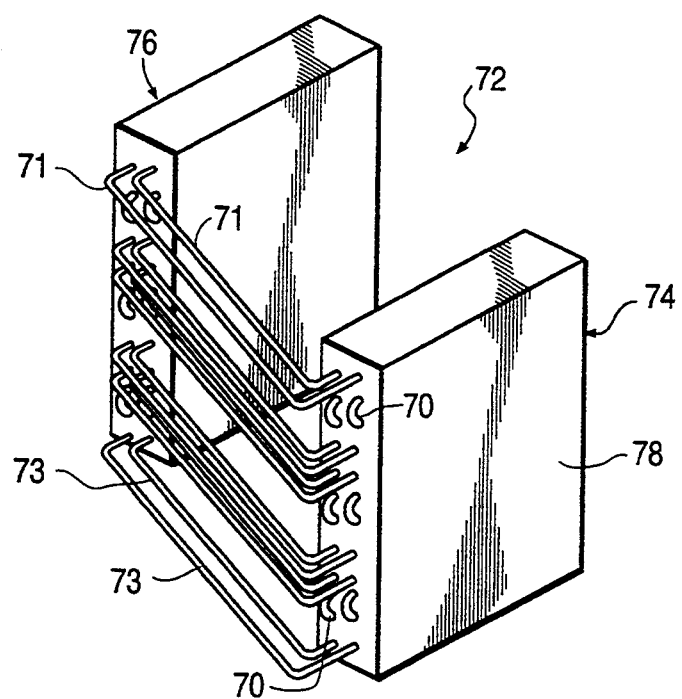
FIG. 6 is a perspective view of a two-section pipe heat exchanger constructed in accordance with the invention having multiple rows of stacked two-section heat pipes.

Turning now to FIG. 5, the serpentine heat pipe 64 is shown as two separate sections. The heat pipe according to this embodiment of the invention includes serpentine coils 60, 61 forming a lower serpentine section 65 which functions as an evaporator, and a higher serpentine section 66 which functions as a condenser. As in the previous embodiment, each of the serpentine coils 60, 61 includes a plurality of U-tubes having the adjacent open ends manifolded together by U-bends 67 instead of one straight copper tube. Again, it has been discovered that this configuration works equally as well as the manifolded device illustrated in FIG. 2, but is significantly less expensive and easier to fabricate. The two serpentine sections 65, 66 are connected to one another via a vapor line 62 and a return line 63, thereby forming the two-section heat pipe 64. Vapor line 62 connects edge tubes 68 and 69 via their respective end openings, while return line 63 connects edges tubes 68A and 69A via their respective end openings. If desired, several two-section heat pipes 70 can be stacked on top of one another and connected by vapor and return lines 71,73 as illustrated in FIG. 6 to form a single heat pipe heat exchanger 72 having an evaporator section 74 and a condenser section 76, each of which includes a plurality of serpentine coils. As in the embodiment of FIG. 4, each section of the heat pipe heat exchanger is imbedded in aluminum fins 78 to promote heat transfer. Moreover, while three U-tubes are shown in the upper and lower serpentine sections 66, 65, it should be understood that the number of U-tubes in each section of the two-section heat pipe exchanger can vary depending on system needs.

The inventive heat pipes and heat pipe heat exchangers can be used to increase the dehumidification capacity of conventional air conditioning systems. More particularly, the evaporator portion of a serpentine heat pipe heat exchanger can be positioned upstream of the primary evaporator of an air conditioner to precool the air flowing through the primary evaporator, and the condenser portion can be positioned downstream of the primary evaporator to reheat the air overcooled by the primary evaporator.

Figure 7:
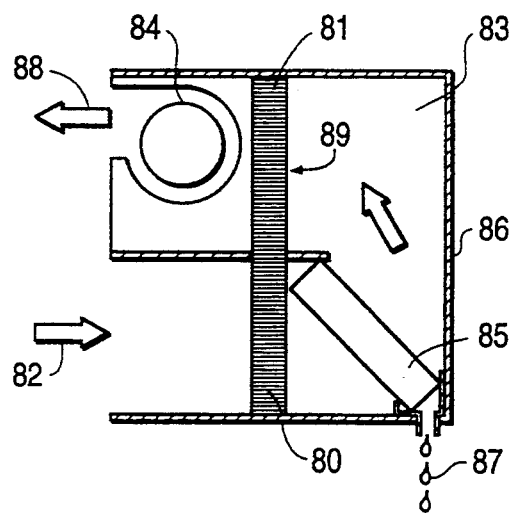
FIG. 7 illustrates a method of installing a serpentine heat pipe heat exchanger in an air conditioning system.

Referring to FIG. 7, a serpentine heat pipe heat exchanger 89 can be installed in a conventional air conditioning system by placing the evaporator portion 80 of a serpentine heat pipe of the heat exchanger 89 in the warm return air path 82 leading to the primary evaporator 85 of the air conditioner and by placing the condenser portion 81 downstream of the primary evaporator 85 in the cool air supply path 88. This positioning allows the refrigerant to vaporize in the evaporator portion 80 and to rise to the condenser portion 81. There, cool air being drawn off from the primary evaporator 85 via a blower 84 is reheated in condenser portion 81, where it condenses the refrigerant in condenser portion 81 before it is discharged from the air conditioner.

Refrigerant vaporizing in the evaporator portion 80 absorbs the heat from return air 82 and precools this air before the air reaches the primary evaporator 85. This precooling allows the primary evaporator 85 to work cooler and thus to condense more moisture, which is discharged from the evaporator as a condensate 87. The vaporized refrigerant in the heat pipe of the serpentine heat exchanger 89 rises to the condenser portion 81, condenses, and releases heat into the supply air 88.

This arrangement provides cool air with lower relative humidity. Demand for such cool, dry air is very high in humid climates and in certain industrial and commercial applications. Precooling and reheating the air in an air conditioner has numerous beneficial results and can save great amounts of energy. For example, by precooling the return air 82, the serpentine heat pipe heat exchanger 89 reduces the cooling load on the compressor of the air conditioner. In addition, by providing dry air, the system reduces humidity and provides better comfort at higher thermostat temperature settings. Finally, by providing free reheating energy, the system replaces the reheat systems currently used in humidity control systems, thus saving substantial energy which would otherwise be consumed by such reheat systems.

Figure 8:
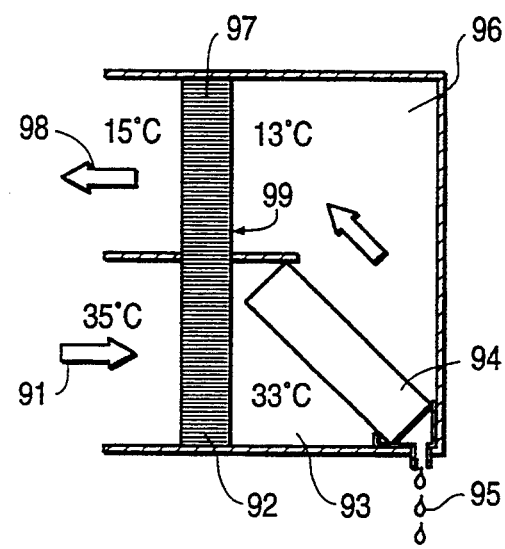
FIG. 8 illustrates the manner of operation of the heat pipe heat exchanger of FIG. 7 in conjunction with an air conditioning system.

The working principles of the serpentine heat pipe heat exchanger in an air conditioning system will now be disclosed with reference to FIG. 8. In the typical case, warm return air 91 at a temperature of, e.g., 35° C. enters the air conditioner and is conveyed through the evaporator portion 92 of a serpentine heat pipe of a serpentine heat pipe heat exchanger 99 and transfers heat to the refrigerant in the heat pipe, thus vaporizing the refrigerant. This heat transfer precools the air exiting the evaporator portion 92 to a somewhat lower temperature of, e.g., 33° C. This cooler air is then dehumidified and cooled in the primary evaporator 94 to a temperature of, e.g., 13° C. The moisture condensing in primary evaporator 94 drains out of the system as a condensate 95. The now overcooled air 96 is then conveyed through the condenser portion 97 of the heat pipe and is slightly reheated to a comfortable temperature of, e.g., 15° C. This heat transfer condenses the refrigerant in the condenser portion 97, and the condensed refrigerant drains back into evaporator portion 92. The thus reheated air 98 is then conveyed out of the air conditioner.

This method of using serpentine heat pipes to precool the return air and to reheat the supply air in an air conditioning system can be applied to the two-section heat pipe exchanger design illustrated in FIGS. 5 and 6. Moreover, there are several ways of positioning the two-section serpentine heat exchangers in air conditioners. Some possible configurations of such serpentine heat exchangers are illustrated in FIGS. 9 and 10.

Figure 9:
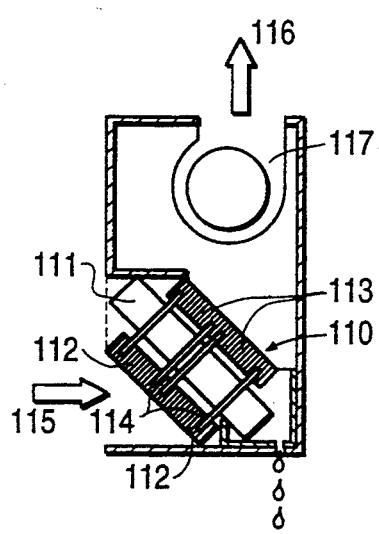
FIG. 9 illustrates a configuration of a two-section heat pipe heat exchanger in an air conditioning system.

Referring to FIG. 9, a two-section serpentine heat pipe heat exchanger 110 can be positioned in an air conditioner in an inclined position. In this embodiment, return air 115 is drawn into the system via a blower 117. The lower or evaporator section 112 of each heat pipe of the heat exchanger 110 is placed in the path of the warm return air 115 leading to the air conditioner evaporator 111. The higher or condenser section 113 of each heat pipe of the heat exchanger 110 is positioned downstream of the evaporator 111 in the path 116 of cold supply air. Each of the sections 112, 113 may comprise several rows of stacked serpentine coils of the types illustrated in FIGS. 6 and 7. The lower and upper coils of each two-section heat pipe are connected by connection lines 114 composed of vapor and return lines connecting the upper and lower ends of the respective coils.

Figure 10:
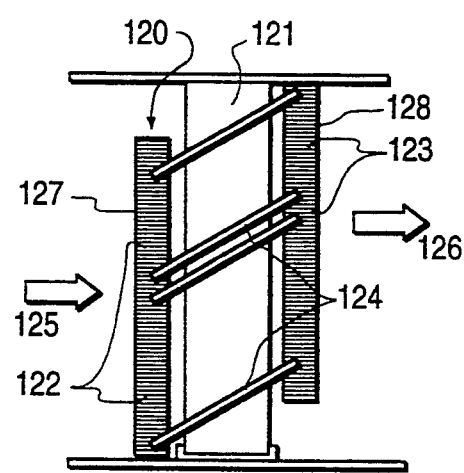
FIG. 10 illustrates yet another configuration of a two-section heat pipe heat exchanger in an air conditioning system.

Referring to FIG. 10, an inventive two-section heat pipe heat exchanger 120 of the type described above in connection with FIGS. 5 and 6 can also be used when an air conditioner evaporator 121 is in a vertical position. According to this embodiment of the invention, the evaporator section 127 of the heat exchanger 120 contains the low or evaporator sections 122 of the individual two-section serpentine heat pipes stacked one on top of the other upstream of the primary evaporator 121 in the path 125 of warm return air. A condenser section 128 of the two-section heat exchanger 120 contains the high or condenser sections 123 of the two-section serpentine heat pipes and is placed in the path 126 of cold supply air. The serpentine coils comprising the low and high sections of each of the heat pipes are connected by connection lines 124. As in the previous embodiments, the air is pre-cooled by the evaporator section 127 and is reheated by the condenser section 128, thus enhancing the dehumidification capacity of the system.

Of course, the serpentine heat pipe heat exchanger of the present invention need not be positioned in an air conditioning system in any of the configurations illustrated above. It is only necessary to design the system such that the evaporator portion or section of one or more serpentine heat pipes functions to precool return air before it is cooled by the primary evaporator of the air conditioning system, and such that the condenser portion or section functions to reheat the supply air after it is cooled by the primary evaporator.

Figure 11:
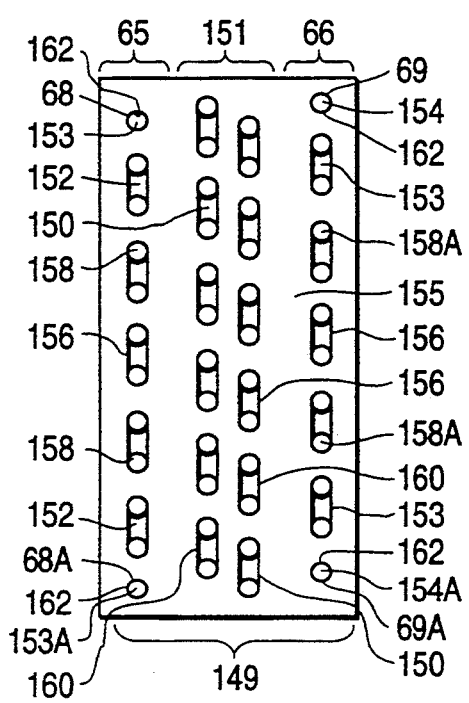
FIG. 11 is a schematic representation of the inventive heat transfer device showing an end plate connecting the sections of two-section heat pipe exchanger and the evaporator of the air conditioning system to form a single assembly.

FIG. 11 shows the inventive heat transfer device 149 which includes a two-section serpentine heat pipe which is similar to that shown in FIG. 5, except that a greater number of U-tubes are shown in the inventive apparatus of FIG. 11. The parts of the two-section heat pipe of FIG. 11 will therefore be referred to by the same numerals as the similar parts of FIG. 5.

The two-section heat pipe has a lower evaporator section 65 and an upper condenser section 66, between which the U-tubes 150 of the air conditioning system evaporator 151 are disposed. The lower evaporator section 65 has individual U-tubes 152, while the upper condenser section 66 has individual U-tubes 153. The edge tube openings of the lower evaporator section 65 are shown at numerals 153, 153A while the edge tube openings of upper condenser section 66 are shown at 154, 154A.

The lower evaporator section 65, upper condenser section 66, and the primary evaporator section 151 are connected to a pair of end plates 155, of which only one is shown. End plate 155 has a plurality of round openings 156 disposed therein through which the open ends 158, 158A of the U-tubes 152, 153, respectively, extend. Additional round openings 160 are disposed in end plate 155 and are designed to receive the U-tubes 150 such that open ends of the U-tubes 150 extend therethrough. The U-tubes 152, 153 and 150 are expanded in a conventional manner such that each of these U-tubes becomes pressure fit within their respective openings. Moveover, the edge tubes 68, 68A, 69, 69A of the upper and lower sections 66, 65 of the two-section heat pipe exchanger are also expanded in a conventional manner such that the edge tubes are pressure fit within circular openings 162 of the end plate 155.

Figure 3:
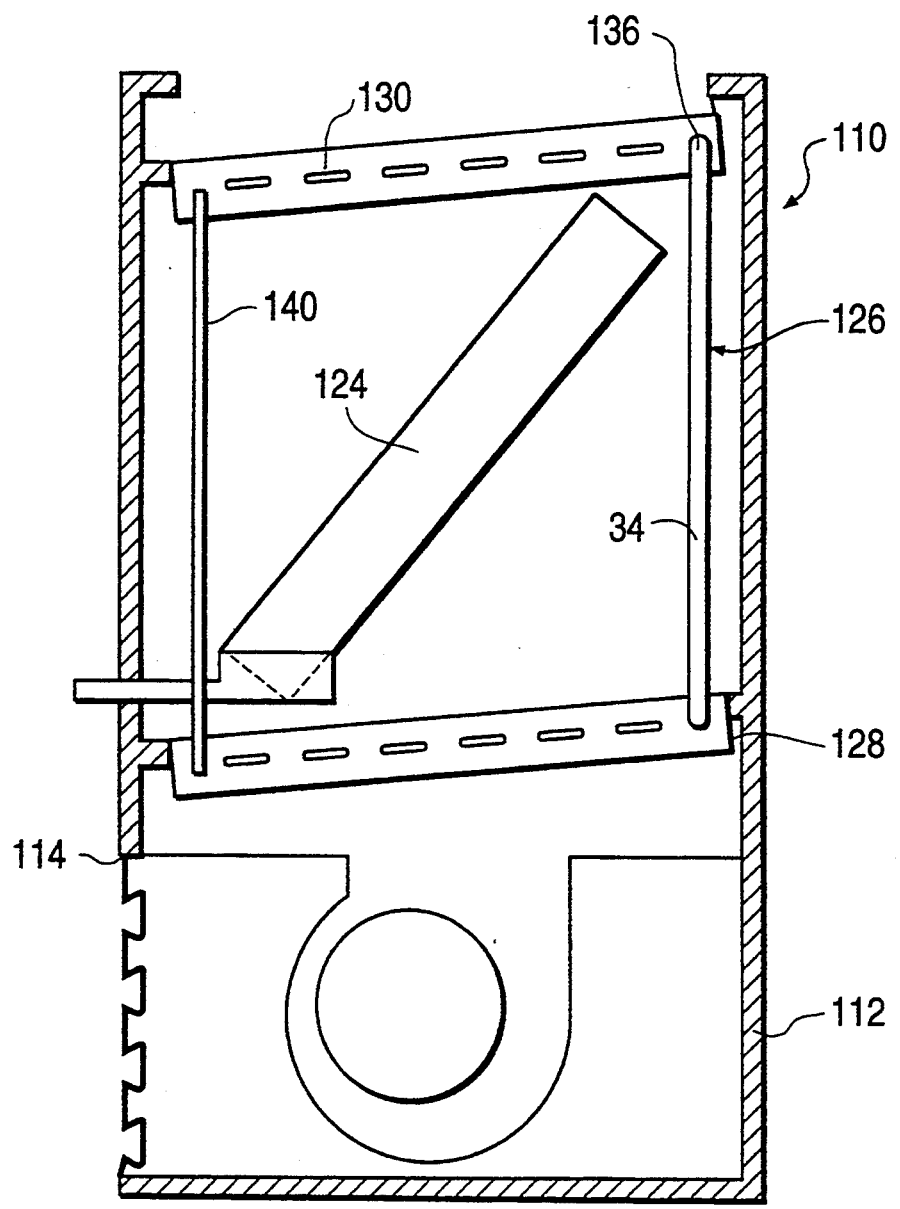
FIG. 3 is an illustration of a conventional configuration of a two-section heat pipe heat exchanger in an air conditioning system.

By using a pair of single end plates 155, to connect the two-sections 65, 66 of the heat pipe and the evaporator 151 to each other, a single assembly heat transfer device is created. The single assembly heat transfer device 149 eliminates the need to fabricate and install each piece of the heat transfer device separately, which reduces the cost of fabrication. For example, once the U-tubes 150, 152, 153, are placed in the end plates 155, a single expanding operation can be utilized in order to pressure fit these U-tubes within their respective openings in the end plate 155. Moreover, while U-bends 67 (not shown in FIG. 3) need to be soldered to the open ends 158, 158A of the U-tubes 152, 153 and the open ends of the U-tubes 150, the soldering operation can be accomplished in a single step. Therefore, due to the innovative single assembly design of the heat transfer device, the fabrication of such a device can be more fully automated which eliminates the need for expensive and time-consuming manual labor.

Figure 12:
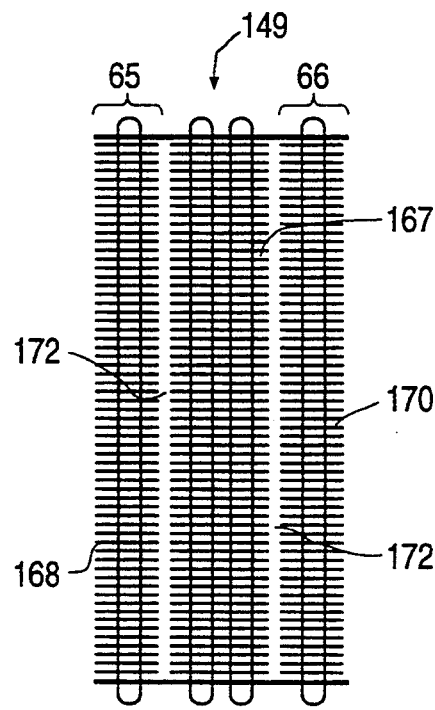
FIG. 12 is a top plan view of the inventive heat transfer device of FIG. 11.

As previously discussed, with respect to FIGS. 6 and 7, each section 65, 66 of the heat pipe exchanger is embedded in aluminum fins 78 to promote heat transfer. Moreover, the evaporator 151 is also embedded in such type fins. FIG. 12 depicts one arrangement of the inventive heat transfer device 149 which shows the U-tubes 150 of the evaporator 151 as being embedded in fins 167 and the U-tubes 152,153 of the evaporator section 65 and condenser section 66, respectively, as being embedded in fins 168, 170, respectively. However, since conductive heat transfer between the heat pipe section 65, 66 and the evaporator 151 is undesirable, a small space 172 is left between the ends of the evaporator fins 167 and the ends of the fins 168, 170 of the two-piece heat pipe exchanger. The small space 172 minimizes the conductive transfer of heat between the evaporator 151 and the heat pipe sections 65, 66.

Figure 13:
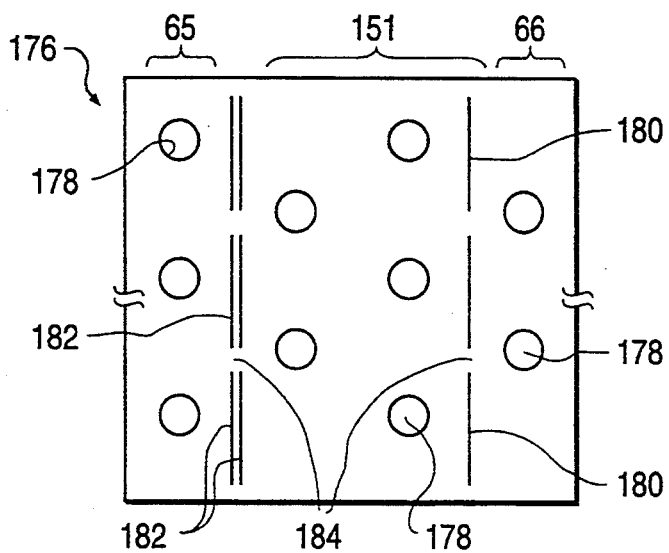
FIG. 13 is a schematic view of a single fin of a second embodiment of the inventive heat transfer device.

FIG. 13 shows a single fin 176 which can be used to minimize conductive heat transfer between the evaporator section 151 and the sections of the two-piece heat exchanger 65, 66, such that the U-tubes 152, 153 of the heat pipe section 65, 66 and the U-tubes 150 of the evaporator section 151 can be disposed within a common series of individual fins 176. The fins 176 each have a plurality of openings 178 corresponding to a part of each of the U-tubes 150, 152, 153 which allows the U-tubes 152, 153, 150 to pass therethrough. Moreover, fin 176 can have either a line of single cuts (slits) 180 running between the evaporator section 151 and either of the heat pipe sections 65, 66, or a double cut (slit) pattern 182 running therebetween. The cuts 180, 182, which can be simple slits, effectively reduce the amount of heat conductive material which exists between the heat transfer device sections 65, 66 and the evaporator section 151, such that only a very small heat transfer passages 184 exist therebetween.

Figure 14:
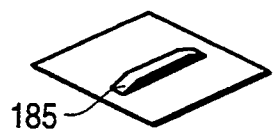
FIG. 14 is a schematic view of a portion of the fin of FIG. 13.

In yet another embodiment of the heat fin 176, the metal portion of the fin which exists between the double cut pattern 182 can be a raised portion 185 as is shown in FIG. 14. Moreover, the single slit 180 can be raised such that it presents a louvered part 186 as is reflected in FIG. 15.

Figure 15:
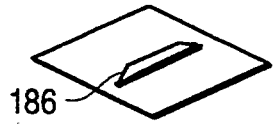
FIG. 15 is a schematic view of a portion of the fin of FIG. 13.

The different types of cut patterns referred to in FIGS. 13–15 all improve the heat transfer between the fin 176 and the ambient air, such that the transfer of heat by conduction between the evaporator section 151 and the sections 65, 66 of the two-piece heat exchanger is effectively reduced. In case no such reduction is desired, the fin can be a flat or sine wave plate without any cutting.

FIGS. 16 and 17 schematically show heat transfer devices according to the invention which have the evaporator section 65 and the condenser section 66 of the two-piece heat pipe exchanger connected via a vapor line 187 and a return line 188. In both FIGS. 16 and 17, the vapor and return lines 187, 188 are reflected as running upwardly from the evaporator section 65 to the condenser section 66 so that the two-section heat pipe works by gravity liquid return when the heat transfer device is installed in a vertical position. Moreover, it has also been found that the heat transfer device works equally well whether a plurality of two section heat pipes of the same design (same number of U-tubes) is used as shown in FIG. 6, or whether a plurality of two-section heat pipes is used with the two-section heat pipes having a different number of U-tubes as is reflected in FIG. 17. The arrows of FIGS. 16 and 17 represent the flow of air across the heat transfer device.

FIG. 18 shows a heat transfer device which is installed in a position that is inclined relative to the horizontal plane. Once again, the vapor lines 187 and return lines 188 are shown as running upwardly from the evaporator section 65 to the condenser section 66.

Figure 19:
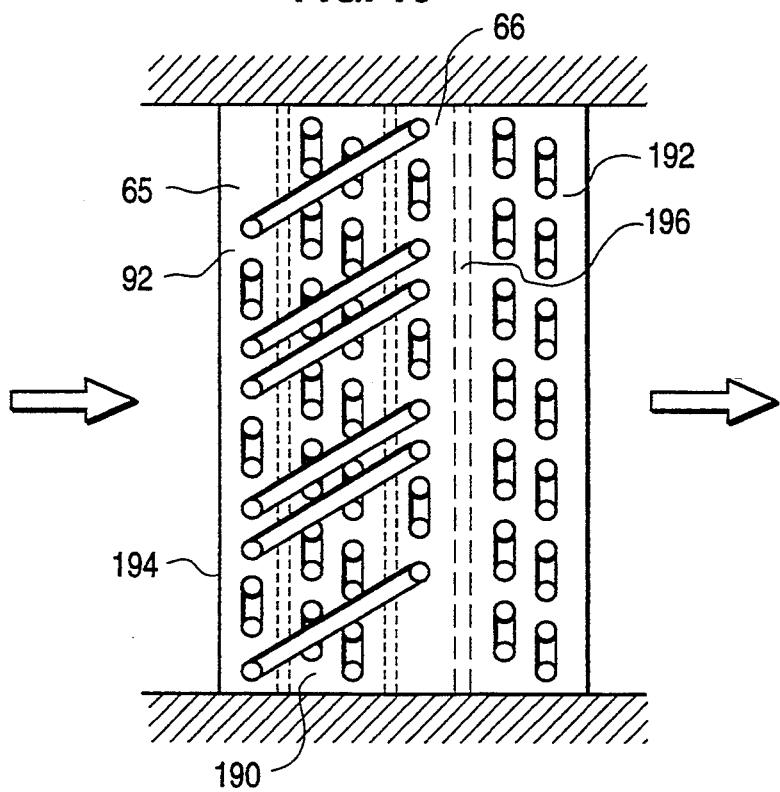
FIG. 19 is a schematic view showing the inventive heat transfer device in a dehumidifier.

FIG. 19 shows the heat transfer device as being used in a dehumidifier in order to produce a more efficient dehumidification system. That is, in a conventional dehumidifier, there is an evaporator and a condenser. However, by placing a two-section heat pipe around the evaporator section of the dehumidifier as shown in FIG. 19, a more efficient dehumidifier is produced. The evaporator section 65 and condenser section 66 of the two-section heat pipe are disposed around the evaporator 190 of the dehumidifier, such that the condenser section 66 of the two-piece heat pipe is disposed between the evaporator section 190 and the condenser 192 of the dehumidifier. Moreover, a single end plate 194 is shown as connecting the evaporator sections 65, 190 and the condenser sections 66, 192 together. The U-tubes of the evaporators 65, 190 and the condensers 66, 192 are connected to the end plate in the same manner as discussed above with respect to FIG. 11. Additionally, a space 196 is provided between condenser 192 and condenser 66 in order to prevent conductive heat transfer therebetween.

Figure 20:
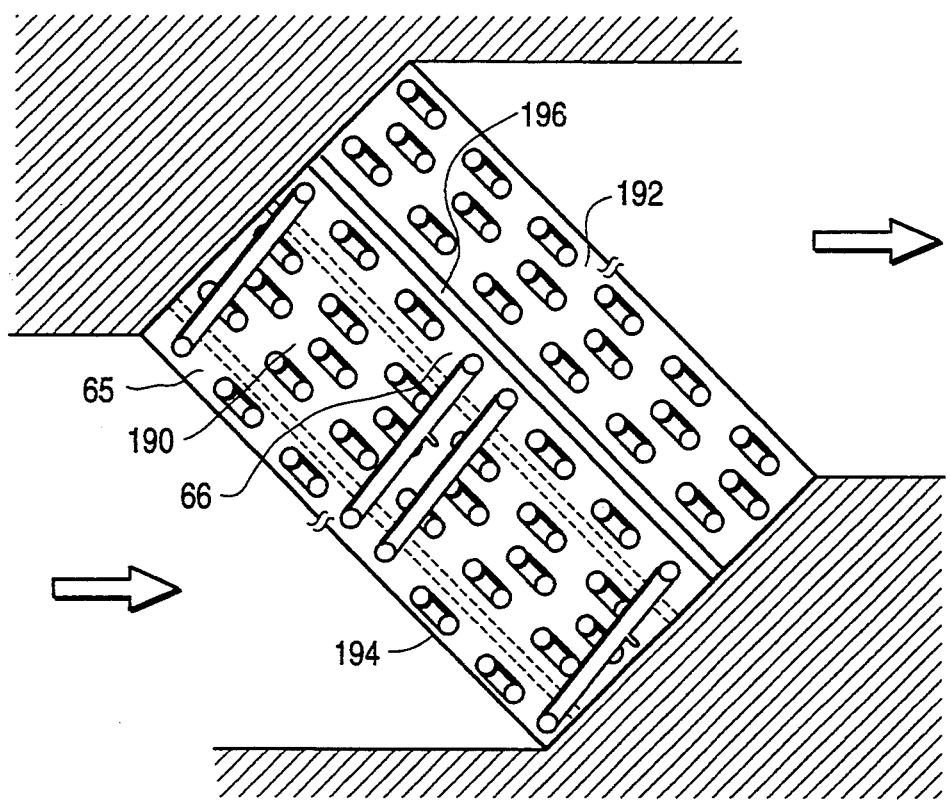
FIG. 20 is a schematic view showing the inventive heat transfer device in an inclined position in a dehumidifier.

FIG. 20 is similar to FIG. 19 except that a different number of two-section heat pipes are shown and the number of U-tubes in each two-section heat pipe is different from that of FIG. 19. Moreover, the entire unified assembly is shown as being oriented in an inclined position relative to a horizontal plane.

Figure 21:
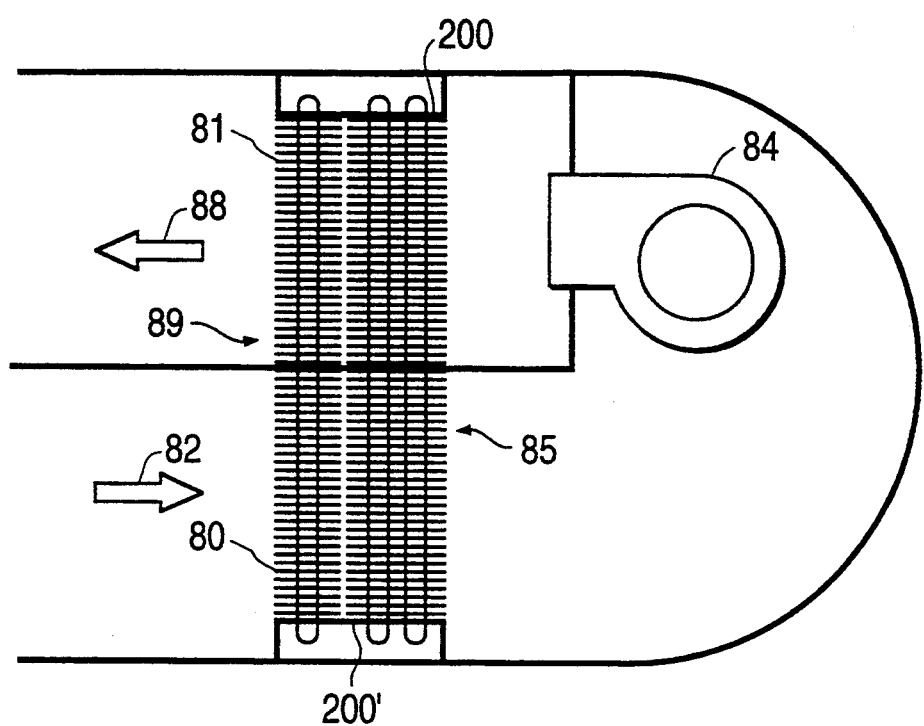
FIG. 21 is a schematic view showing the inventive heat transfer device installed in a U-turn airflow arrangement.

FIG. 21 shows the inventive heat transfer device when a mono assembly evaporator/heat pipe as shown in FIG. 7 is used. Accordingly, the numerals of FIG. 7 are used to identify similar parts of FIG. 21. However, in FIG. 21, the serpentine heat pipe of the heat exchanger 89 and the primary evaporator 85 are connected to common end plates 200, 200' in the manner discussed above relative to FIG. 11. Thus, the end plates 200, 200' form a single assembly including the heat pipe 89 and the primary evaporator 85. The apparatus of FIG. 21 operates in a similar manner as described for FIG. 7, except that the blower 84 is positioned in a U-turn portion and draws air from a lower portion of primary evaporator 85 and blows it across an upper portion of primary evaporator 85 and the condenser section 81 of the serpentine heat pipe 89. Thus, supply air 88 is provided while return air 82 is drawn across the evaporator section 80 of the heat pipe 89.

What is claimed is:

1. A single assembly heat transfer device installed in an environmental control apparatus, the single assembly heat transfer device comprising:
   a primary evaporator;
   a heat pipe including a serpentine evaporator section, a serpentine condenser section, a vapor line, and a refrigerant return line, said vapor and refrigerant return lines each connecting said evaporator and condenser sections to each other to form a two section heat pipe and said heat pipe being wrapped around said primary evaporator such that said evaporator and condenser sections are disposed on opposite sides of said primary evaporator; and
   first and second end plates upon each of which said condenser section, said evaporator section and said primary evaporator are mounted to form a single assembly.

2. A single assembly heat transfer device as claimed in claim 1, wherein said evaporator and condenser sections each include a plurality of U-shaped tubes extending through first corresponding ones of a plurality of openings in at least one of said first and second end plates so that adjacent open ends of said U-shaped tubes extend beyond an outer surface of said at least one of said first and second end plates, and further comprising U-shaped connectors interconnecting said adjacent open ends.

3. A single assembly heat transfer device as claimed in claim 2, wherein said primary evaporator includes a plurality of primary evaporator U-tubes which extend through second corresponding ones of said plurality of openings in said at least one of said first and second end plates so that adjacent open ends of said primary evaporator U-tubes extend beyond an outer surface of said end plate and further comprising U-bends interconnecting said adjacent open ends of said primary evaporator U-tubes.

4. A single assembly heat transfer device as claimed in claim 3, wherein said plurality of U-shaped tubes of said evaporator section are surrounded by a first set of fins, said plurality of U-shaped tubes of said condenser section are surrounded by a second set of fins, and said plurality of U-tubes of said primary evaporator are surrounded by a third set of fins, and wherein a first space is defined between said first set of fins and said third set of fins, and a second space is defined between said second set of fins and said third set of finds, said first and second spaces, respectively, preventing conductive heat transfer between said primary evaporator and said evaporator section, and between said condenser section and said primary evaporator.

5. A single assembly heat transfer device as claimed in claim 3, further comprising a set of individual fins, and wherein said plurality of U-shaped tubes of said evaporator and condenser sections and said plurality of U-tubes of said primary evaporator all pass through each of said individual fins.

6. A single assembly heat transfer device as claimed in claim 5, wherein said individual fins have a line of slits extending between said primary evaporator and one of said evaporator and condenser sections so that conductive heat transfer between said primary evaporator and said one of said evaporator and condenser sections is minimized.

7. A single assembly heat transfer device as claimed in claim 5, wherein said individual fins have parallel lines of slits extending between said primary evaporator and at least one of said evaporator and condenser sections so that conductive heat transfer between said primary evaporator and said one of said evaporator and condenser sections is minimized.

8. A heat transfer device as claimed in claim 1, further comprising a primary condenser which is mounted to said first and second end plates downstream of said condenser section such that a gap exists between said condenser section and said primary condenser.

9. A single assembly heat transfer device installed in an environmental control apparatus, said single assembly heat transfer device comprising:
 a primary evaporator;
 a two-section heat pipe having an evaporator section and a condenser section;
 an end plate upon which said primary evaporator, said evaporator section and said condenser section are mounted, thereby forming a single assembly,
 wherein said end plate has a plurality of openings therein through which said primary evaporator, said evaporator section and said condenser section extend, said plurality of openings serving as mounting points,
 wherein said evaporator and condenser sections are connected to each other and each include a plurality of U-shaped tubes extending through first corresponding ones of said plurality of openings in said end plate so that said adjacent open ends extend beyond an outer surface of said end plate, and further comprising U-shaped connectors interconnecting said adjacent open ends such that said evaporator and condenser sections are each formed as first and second serpentine heat pipe sections, and wherein after said connected condenser and evaporator sections are subject to vacuum, they are charged with a refrigerant; and
 further comprising a plurality of two-section heat pipes, and wherein the number of said U-shaped tubes in each two-section heat pipe is different.

10. A heat transfer device installed in an environmental control apparatus, said single assembly heat transfer device comprising:
 a primary evaporator;
 a two-section heat pipe having an evaporator section and a condenser section;
 an end plate upon which said primary evaporator, said evaporator section and said condenser section are mounted, thereby forming a single assembly; and
 a primary condenser which is mounted to said end plate downstream of said condenser section such that a gap exists therebetween;
 wherein said end plate has a plurality of openings therein through which said primary evaporator, said evaporator section and said condenser section extend, said plurality of openings serving as mounting points,
 wherein said evaporator and condenser sections are connected to each other and each include a plurality of U-shaped tubes extending through first corresponding ones of said plurality of openings in said end plate so that said adjacent open ends extend beyond an outer surface of said end plate, and further comprising U-shaped connectors interconnecting said adjacent open ends such that said evaporator and condenser sections are each formed as first and second serpentine heat pipe sections, and wherein after said connected condenser and evaporator sections are subject to vacuum, they are charged with a refrigerant,
 wherein said primary evaporator includes a plurality of primary evaporator U-tubes which extend through second corresponding ones of said plurality of openings in said end plate so that adjacent open ends of said primary evaporator U-tubes extend beyond an outer surface of said end plate and further comprising U-bends interconnecting said adjacent open ends of said primary evaporator U-tubes, and
 wherein said evaporator section is mounted upstream from said primary evaporator and said condenser section is mounted downstream from said primary evaporator.

* * * * *